United States Patent [19]
Lee et al.

[11] Patent Number: 4,883,523
[45] Date of Patent: Nov. 28, 1989

[54] AVOIDANCE OF SURFACE DETERIORATION OF GLASS DURING STRENGTHENING PROCESSES

[75] Inventors: Huai-Chuan Lee, Albany; Hisayoshi Toratani, Fremont; Helmuth E. Meissner, Pleasanton, all of Calif.

[73] Assignee: Hoya Optics, Inc., Fremont, Calif.

[21] Appl. No.: 194,786

[22] Filed: May 17, 1988

[51] Int. Cl.$^4$ .............................................. C03B 27/02
[52] U.S. Cl. .................................. 65/30.14; 65/30.13; 65/116
[58] Field of Search ...................... 65/116, 30.13, 30.14

[56] References Cited

U.S. PATENT DOCUMENTS

| | | | |
|---|---|---|---|
| 3,287,201 | 11/1966 | Chisholm et al. | 161/1 |
| 3,425,816 | 2/1969 | Garfinkel et al. | 65/30.14 |
| 3,630,704 | 12/1971 | Garfinkel et al. | 65/30 |
| 3,687,799 | 8/1972 | Spanoudis | 65/116 X |
| 3,711,393 | 1/1973 | Garfinkel | 65/30.13 X |
| 4,038,090 | 7/1977 | Gliemeroth | 106/53 |
| 4,756,733 | 7/1988 | Houde-Walter et al. | 65/30.13 |

OTHER PUBLICATIONS

T. S. Izumitani, "Optical Glass," American Institute of Physics Translation Series, N.Y. 1986.
M. J. Weber, ed., CRC Handbook of Laser Science and Technology, vol. I, Lasers and Masers, CRC Press, Boca Raton, FL.
S. H. White, "The Role of Water During the Purification of High-Temperature Ionic Solvents," *Ionic Liquids*, Inman & Lovering, eds., Plenum Press, London, 1981.
K. A. Cerqua et al., "Strengthened Glass for High Average Power Laser Applications," SPIE Proceedings, vol. 736, 1987.
K. A. Cerqua et al., "Ion Exchange Strengthening of Nd Doped Phosphate Laser Glass," 17th Annual Symposium on Optical Materials for High Power Lasers, Nov. 1985.

*Primary Examiner*—Arthur Kellogg
*Attorney, Agent, or Firm*—Townsend and Townsend

[57] ABSTRACT

Processes in which glass parts are strengthened by ion exchange with cations in a molten salt bath are improved by removal of the small amounts of moisture and other forms of the hydroxyl group present in the salt melt by either chemical or electrolytic means, prior to the ion exchange. The chemical means involve reacting the hydroxyl-containing compounds with the chlorine-containing gas, while the electrolytic means involve electrolysis to gaseous hydrogen and oxygen. Preferred embodiments further include a gas purge prior to the chemical or electrolytic treatment.

28 Claims, No Drawings

AVOIDANCE OF SURFACE DETERIORATION OF GLASS DURING STRENGTHENING PROCESSES

This invention relates to the strengthening of glass by ion exchange.

BACKGROUND OF THE INVENTION

The strengthening of glass is useful for a number of applications, including glass slabs used in high power lasers. Strengthening serves to increase the thermal loading capability of the glass, as a means of increasing resistance to thermal shock.

Ion exchange is routinely used by the glass industry as a means of strengthening glass. The result is the introduction of a compressive stress to the glass surface, thereby increasing the capability of the glass to withstand stress without fracturing. The ion exchange, which replaces mobile cations present throughout the glass with larger cations (and frequently, successively larger cations in stages), is implemented by immersion of the glass in a molten salt bath.

One of the problems associated with the use of molten salt baths is the reaction of certain components of the glass with moisture or hydroxyl ion present either on the surface of the glass or dissolved in the salt melt. The reaction product adheres to the polished glass surface and is detrimental to the finish of the glass and its transmission properties. The reaction product may be removed by polishing the surface of the glass following the ion exchange in the salt melt. This however is expensive and time-consuming, and can also result in the removal of part or all of the compressive layer formed by the ion exchange treatment. In phosphate glass, the problem is particularly troublesome, since phosphate glass is in general easily corroded by water or hydroxyl ions in the salt melt.

SUMMARY OF THE INVENTION

It has now been discovered that the small amounts of moisture and hydroxyl ion in general can be removed from the salt melt to eliminate the tendency for the formation of surface deposits on the glass part being treated, by a process involving treatment of the salt melt, either chemically or electrically, prior to and/or during the ion exchange. The chemical treatment involves purging the melt with a chlorine-containing gas, while the electrical treatment involves electrolysis. These are alternatives, and either one is performed following an initial purging of the salt melt with a maintenance gas, which term is used herein to mean a gas which maintains the salt melt substantially in its original chemical form, without chemical degradation or conversion other than the ion exchange. In certain salt melts which are susceptible to reduction, the maintenance gas may be one which provides an oxidizing atmosphere, thereby minimizing or preventing reduction. In some cases as well, the use of gases of a particular chemical character as the maintenance gas will serve to maintain the chemical structure of melts of particular types of salts. In further embodiments of the invention, the process is supplemented by treatment of the glass surface with moisture-removing reagents prior to immersion in the salt melt.

Other features, advantages and embodiments of the invention will be apparent from the following description.

DETAILED DESCRIPTION OF THE INVENTION AND PREFERRED EMBODIMENTS

Chemical treatment of the salt melt for the removal of moisture and hydroxyl ions in general in accordance with the invention is achieved by contacting the melt with a chlorine-containing gas, preferably bubbling the gas through the melt in a manner maximizing the contact between the gas and the molten salt. The chlorine-containing gas reacts with the moisture and hydroxyl to form hydrogen chloride gas and co-products depending on the nature of the chlorine-containing gas. The agitating action of the gas on the salt melt serves to drive the gaseous reaction products from the melt, thereby providing a melt substantially free of moisture, hydroxyl, or undesired reaction products,. Examples of the actual chemical form of chlorine-containing gas is not critical. A wide variety of chlorine-containing species may in fact be used. Notably examples are $Cl_2$, $POCl_3$, $PCl_3$, $SOCl_2$, $SO_2Cl_2$ and $CCl_4$. Chlorine gas itself ($Cl_2$) is particularly preferred.

The electrolysis is an alternative to the chlorine-containing gas. Electrolysis is achieved by passing a current through the salt melt to hydrolyze any moisture or other hydroxyl present to hydrogen and oxygen gas which then escape from the melt. With the salt melt itself serving as the electrolyte, the current is established by impressing a voltage across a pair of electrodes in contact with the salt melt. Conventional types of equipment and procedures may be used to accomplish this, provided that the materials are compatible with the salt melt, and inert with respect thereto other than their function in transmitting the current.

In either case, it is preferably to precede the treatment (either chemical or electrolytic) with a purging of the salt melt by a maintenance gas, to remove at least a portion of the moisture by evaporation and entrainment. The purging process is preferably performed in such a manner that the purging gas agitates the salt melt in a manner which further promotes moisture evaporation and removal. At all times, of course, the salt melt is maintained at a sufficiently elevated temperature to keep it in liquid form.

The term "maintenance gas" is used herein to include gases which are generally inert, i.e., nonreactive toward any species (and thus neither oxidizing nor reducing), as well as species which are reactive with decomposition or degradation products of the salt melt to convert them back to their original form as part of the salt melt. For instance, where the salt melt has a tendency toward deterioration by reduction, the maintenance gas may be one which establishes an oxidizing atmosphere. Oxygen gas itself is a notable example. As another example, nitrogen dioxide gas ($NO_2$) is particularly useful in salt melts which contain nitrate salts, since it enhances the stability of the salts against decomposition to nitrites (by regenerating the nitrites back to nitrates). Decomposition of nitrates to nitrites occurs to a troublesome extent in salt baths used at very high temperatures, which are required for ion exchange with certain types of glass. The use of $NO_2$ thus increases the versatility of the process, expanding the range of glasses to which it may be used effectively. In systems where $NO_2$ is used, the $NO_2$ may be diluted in another maintenance (including oxidizing) gas. The concentration of $NO_2$ in such gaseous mixtures is not critical and may vary widely. For practical considerations of controlling exhaust gases, however, small concentrations are preferred. In most cases, a $NO_2$: diluent volume ratio between about 0.0001 and about 0.05, preferably between about 0.001 and about 0.01, will give the best results.

Examples of maintenance gases other than oxygen are nitrogen and argon. Other possibilities will have unique advantages depending on the salt used in the salt melt.

When a chlorine-containing gas is used, it may be diluted in the maintenance gas for improved efficiency. The amount of dilution is not critical and can vary widely. Best results will generally be obtained at a volume ration (chlorine-containing gas to maintenance gas) of between about 0.0001 and 0.5, with 0.001 to 0.1 preferred and 0.005 to 0.05 particularly preferred.

In some cases, surface hydroxyl groups are already present on the glass surface prior to the ion-exchange strengthening treatment. These hydroxyl groups may be removed by contacting the glass part with a chlorine-containing gas prior to immersion in a salt melt. A variety of chlorine-containing gases may be used, including those listed above. Here as well, it is preferably to dilute the chlorine-containing gas in an maintenance diluent gas. As a matter of convenience, the mixture may be the same as that used in the purge of the salt melt as described above.

This gas treatment is preferably performed prior to the ion exchange treatment, and may further be used as a preheating step to bring the glass part to the temperature of the salt melt prior to immersion.

When an electrolytic process is used for the removal of the moisture and other hydroxyl present after the maintenance gas purge, it is preferred to continue the purge through out the electrolysis.

The following examples are offered primarily for illustration, and are intended neither to define nor limit the invention in any manner.

EXAMPLE 1

This example demonstrates the use of a chlorine-containing gas in removing the final traces of moisture and other hydroxyl-bearing components from the salt melt following the maintenance gas purge.

An amount of $KNO_3$ sufficient to cover a 32 cm long laser slab (i.e., about 12 kg of $KNO_3$) was melted in a reaction vessel at 350° C. A bubbling tube was lowered into the resulting melt, and dry $O_2$ gas was bubbled through the tube into the melt at 0.8 L/min for approximately 24 hours. The $O_2$ purge was then replaced with a purge by a mixture of $O_2$ and $Cl_2$, the $CL_2$ at a flow rate of 0.05 L/;min and the $O_2$ the same as before. The $O_2/Cl_2$ purge was continued for about 4 hours.

A carefully cleaned zigzag slab of LSG91H laser glass (a $Nd_2O_3$-containing laser glass available from Hoya Optics, Inc., Fremont, Calif.) was mounted on an aluminum fixture, in which it was supported by a fused quartz rod connected to the top of the fixture with its Brewster angle knife edge supported by a plate of boron nitride. The fixture with slab was placed in the reaction vessel in the gaseous atmosphere above the salt melt, where it was permitted to equilibrate to the prevailing temperature. A mixture of $O_2$ and $Cl_2$ of the proportions described above was then passed through the atmosphere surrounding the slab, heating the slab to 350° C.

The fixture with slab was then immersed in the salt melt and held there for 48 hours while the temperature was maintained at 350° C. After this treatment, the fixture with slab was lifted above the salt melt and permitted to cool in stages to about 200° C. followed by 40° C., then removed from the reactor vessel.

Following treatment, the slab was cleaned with water and acetone, and tested for transmission in a total internal reflection zigzag beam propagation mode and found to be unchanged from an untreated slab within experimental error. The slab was also tested for its thermal loading capacity in a laser test bed, where it was found to withstand twice the flash lamp power input (about 12,000 watts) that could be withstood by an untreated (non-strengthened) slab. The breakage pattern of the slab was typical of a strengthened slab, with fragments of about 4–5 $cm^2$ from each of the slab faces.

The effectiveness of the $O_2$ and $O_2/Cl_2$ purges was confirmed by the total lack of surface deterioration on the slab following removal from the salt melt. This compares with similar treatments without the purges, where visible surface deterioration was present.

EXAMPLE 2

This example demonstrates the use of electrolysis in place of the treatment with a chlorine-containing gas.

An aluminum container was used as the reaction vessel and also as one of the electrodes. The counter electrode was a ring-shaped aluminum electrode introduced through the top cover of the vessel, surrounding a glass frit at the bottom of the vessel used for the gas purge.

The reaction vessel was charged with 12 kg of $KNO_3$, which was then melted at 350° C. Dry $O_2$ gas was then bubbled through the frit into the melt for 24 hours at 0.5 L/min. (In a separate experiment, the $O_2$ gas was substituted with argon.) The $O_2$ gas purge was then continued with $NO_2$ added at a concentration of 0.3% (volume basis) for 4 hours, followed by an additional hour of $O_2$ gas only to remove remaining $NO_2$ from the salt melt.

A laser glass slab was then mounted in a fixture as described in Example 1, and gradually lowered into the reaction vessel to be preheated to 350° C. prior to immersion in the salt melt. A voltage of 1 volt d.c. was then impressed across the electrodes, and the slab was immersed in the melt. The voltage was maintained between 0.5 and 1.5 volts while $O_2$ was continuously bubbled through the melt with the slab submerged and the temperature maintained at 350° C. This continued for 100 hours.

The slab was then removed from the melt and gradually cooled down, rinsed in water at room temperature, and carefully cleaned to permit inspection of the optical surfaces. No surface deterioration was detected. The strength of the slab was measured in terms of its thermal loading as described in Example 1, and it was found to be about twice its original strength.

EXAMPLE 3

This example demonstrates the use of a chlorine-containing gas in removing the final trace of moisture and other hydroxyl-bearing components from the salt melt following maintenance gas purge. This example also demonstrates the use of temperature control of the salt melt in acquiring higher compressive stress at surfaces of the treated phosphate glass.

Three sets of experiments were conducted using the $KNO_3$ salt melt at three different temperatures (i.e., 350° C., 380° C., and 400° C., respectively) for treating the phosphate glass. In each set of experiments, twelve kilograms of $KNO_3$ were charged into a quartz reaction vessel and were then melted at 350° C. in a dry oxygen atmosphere. Dry $O_2$ gas was then bubbled through a frit disk into the melt for 24 hours at a flow rate 0.5 liters/minute. The $O_2$ bubbling was then replaced with a combination of $O_2$, $Cl_2$, and $NO_2$ bubbling, the $Cl_2$ at a flow rate of 0.05 liter/minute, $NO_2$ at a flow rate of 0.1 liter/minute, and $O_2$ at the same rate as before. The $O_2/Cl_2/NO_2$ mixture bubbling was continued for four hours. Then the temperature of the salt melt was adjusted to a designated level (namely, 350° C., 380° C., or 400°C.).

In each set of experiments a number of phosphate glass samples each with a dimension of 25 mm×15 mm×2 mm were placed in separate sample holders made of aluminum wire. Each sample holder was shaped like a wire cage which secured the sample position in the melt and allowed the maximum contact between glass surface and the salt melt. Each sample holder was mounted separately to an aluminum fixture designed to either hold a large size laser glass slab (e.g., 320 mm×100 mm×20 mm) or to hold many smaller glass samples, as in our experiments. The fixture with carefully cleaned glass samples and sample holders was then placed in the reaction vessel in the gaseous atmosphere above the salt melt, where it was preheated for twenty minutes to reach approximately the temperature of the salt melt. The fixture with a number of phosphate glass samples was then immersed in the salt melt and held there for a designated length of time (e.g., 24 hours). After a designated treating time, the fixture with glass samples was lifted above the salt and permitted to cool in stages to 300° C., 150° C., and 50° C. then one or two glass samples with the sample holders were removed from the fixture. The fixture with the remaining glass samples was placed back in the reaction vessel following the same procedure as before, then immersing it into the salt melt again. The remaining glass samples were removed sequentially following the same procedure at various time intervals until all the samples were removed from the reaction vessel.

Each glass sample was carefully removed from its sample holder and cleaned with warm water and acetone. Visual examination showed no sign of deterioration on the polished surface. The sample was then prepared for a sequence of examinations (i.e., transmission spectroscopy, surface strain scope test, electron probe micro analysis, and fracture test). The transmission spectroscopy data showed that the change of percentage transmission of light between wave lengths of 1.1 $\mu$m and 0.95 $\mu$m did not exceed 0.1% which is within the limit of experimental errors. A typical result from the surface strain scope showed that a phosphate glass sample treated for 39 hours at 350° C. acquired a 10 $\mu$m thick compressive stress layer with the maximum stress about 225 MPa. The thickness and the magnitude of the maximum stress of the compression layer were correlated to the treating temperature as well as the treating time, whereupon it was found that at 350° C., the thickness of the stress layer ranged from 20 $\mu$m after 24 hours treatment to 50 $\mu$m after 250 hours treatment; and the corresponding maximum compressive stresses within the layers were 350 MPa and 200 MPa, respectively. At 380° C., the thicknesses of the stress layers ranged from 25 $\mu$m after 24 hours treatment to 50 $\mu$m after 150 hours treatment; and the corresponding maximum compressive stresses within the layers were 250 MPa and 100 MPa, respectively. Finally, at 400° C., the thickness of the stress layers ranged from 32 $\mu$m after 24 hours treatment to 60 $\mu$m after 90 hours treatment, and the corresponding maximum stresses within the layers were from 200 MPa and 100 MPa, respectively. Reduction in compressive stress at longer treatment and higher temperature is ascribed to a relaxation of the glass structure.

The foregoing is offered primarily for purposes of illustration. It will be readily apparent to those skilled in the art that one can introduce numerous variations and modifications of the materials, procedural steps and operating conditions disclosed herein without departing from the spirit and scope of the invention.

What is claimed is:

1. In a process for strengthening a glass part comprising immersing said glass part in a salt melt containing an alkali metal salt to effect ion exchange therewith, the improvement comprising purging said salt melt with a chlorine-containing gas to convert substantially all water and all hydroxyl ions dissolved therein to hydrogen chloride gas.

2. A process in accordance with claim 1 in which said chlorine-containing gas is a member selected from the group consisting of $Cl_2$, $POCl_3$, $PCl_3$, $SOCl_2$, $SO_2Cl_2$ and $CCl_4$.

3. A process in accordance with claim 1 in which said chlorine-containing gas is $Cl_2$.

4. A process in accordance with claim 1 further comprising purging said salt melt with a maintenance gas prior to said chlorine-containing gas to remove a substantial portion of said water and hydroxyl ions dissolved therein, whereby the remainder are converted by said chlorine-containing gas.

5. A process in accordance with claim 4 in which said maintenance gas is a member selected from the group consisting of $O_2$, $N_2$ and Ar.

6. A process in accordance with claim 4 in which said salt melt contains a nitrate salt and said maintenance gas is one selected to provide an oxidizing atmosphere and thereby substantially prevent reduction of said nitrate salt.

7. A process in accordance with claim 4 in which said salt melt contains a nitrate salt and said maintenance gas is $O_2$.

8. A process in accordance with claim 1 in which said chlorine-containing gas is diluted in a maintenance gas.

9. A process in accordance with claim 1 in which said chlorine-containing gas is diluted in a maintenance gas to a volume ratio between about 0.0001 and about 0.5.

10. A process in accordance with claim 1 in which said chlorine-containing gas is diluted in a maintenance gas to a volume ration between about 0.001 and about 0.1.

11. A process in accordance with claim 1 in which said chlorine-containing gas is diluted in a maintenance gas to a volume ratio between about 0.005 and about 0.05.

12. A process in accordance with claim 4 in which said maintenance gas and said chlorine-containing gas, respectively, are bubbled through said salt melt.

13. In a process for strengthening a glass part comprising immersing said glass part in a salt melt containing an alkali metal nitrate salt to effect ion exchange therewith, the improvement comprising:
   (a) purging said salt melt with $O_2$ to remove at least a substantial portion of any water and any hydroxyl ions dissolved therein; and
   (b) purging said salt melt with a mixture of $Cl_2$ and $O_2$ having a $Cl_2:O_2$ ratio between about 0.005 and about 0.05 to convert substantially all water and all hydroxyl ions remaining therein after step (a) to hydrogen chloride gas.

14. A process in accordance with claim 1 in which said salt melt contains a nitrate salt and said process further comprises contacting said salt melt with $NO_2$.

15. A process in accordance with claim 1 in which said salt melt contains a nitrate salt and said process further comprises purging said salt melt prior to said chlorine-containing gas with a gaseous mixture containing $NO_2$ and a diluent selected from the group consisting of $O_2$, $N_2$ and Ar.

16. A process in accordance with claim 15 in which said mixture has a $NO_2$:diluent volume ration between about 0.0001 and about 0.05.

17. A process in accordance with claim 15 in which said mixture has a $NO_2$:diluent volume ratio between about 0.001 and about 0.01.

18. A process in accordance with claim 1 further comprising preheating said glass part in a gaseous atmosphere containing a chlorine-containing gas prior to immersion in said salt melt to remove at least a substantial portion of any deposits present on the surface thereof.

19. A process in accordance with claim 18 in which said chlorine-containing gas in said gaseous atmosphere is a member selected from the group consisting of $Cl_2$, $POCl_3$, $PCl_3$, $SOCl_2$, $SO_2Cl_2$ and $CCl_4$.

20. A process in accordance with claim 18 in which said chlorine-containing gas in said gaseous atmosphere is $Cl_2$.

21. A process in accordance with claim 18 in which said gaseous atmosphere is comprised of said chlorine-containing gas diluted in a maintenance gas.

22. A process in accordance with claim 18 in which said gaseous atmosphere is comprised of said chlorine-containing gas diluted in a maintenance gas to a volume ration between about 0.0001 and about 0.5.

23. In a process for strengthening a glass part comprising immersing said glass part in a salt melt containing an alkali metal nitrate salt to effect ion exchange therewith, the improvement comprising:

(a) purging said salt melt with a gaseous mixture of $NO_2$ and $O_2$ having a $NO_2$:$O_2$ volume ratio between about 0.001 and 0.01 to remove at least a substantial portion of any water and any hydroxyl ions dissolved therein;

(b) preheating said glass part in a gaseous atmosphere comprising $Cl_2$ and $O_2$ at a $Cl_2$:$O_2$ ratio between about 0.0001 and about 0.5 prior to immersion in said salt melt to remove from the surface of said glass part at least a substantial portion of any water and hydroxyl ions present thereon: and (c) purging said salt melt with a mixture of $Cl_2$ and $O_2$ having a $Cl_2$:$O_2$ ratio between about 0.005 and about 0.05 to convert substantially all water and all hydroxyl ions remaining therein after step (a) to hydrogen chloride gas.

24. In a process for strengthening a glass part comprising immersing said glass part in a salt melt containing an alkali metal salt to effect ion exchange therewith, the improvement comprising preheating said glass part in a gaseous atmosphere containing a chlorine-containing gas prior to immersion in said salt melt to remove at least a substantial portion of any deposits present on the surface thereof, and passing an electric current through said salt melt to electrolyze substantially all water therein under conditions promoting the escape of gases thus formed from said salt melt.

25. A process in accordance with claim 24 in which said chlorine-containing gas in said gaseous atmosphere is a member selected from the group consisting of $Cl_2$, $POCl_3$, $PCl_3$, $SOCl_2$, $SO_2Cl_2$ and $CCl_4$.

26. A process in accordance with claim 24 in which said chlorine-containing gas in said gaseous atmosphere is $Cl_2$.

27. A process in accordance with claim 24 in which said gaseous atmosphere is comprised of said chlorine-containing gas diluted in a maintenance gas.

28. A process in accordance with claim 24 in which said gaseous atmosphere is comprised of said chlorine-containing gas diluted in a maintenance gas to a volume ratio between about 0.0001 and about 0.5.

* * * * *